Nov. 30, 1943.    W. R. KROMER ET AL    2,335,595
BEVERAGE DISPENSER
Filed Feb. 20, 1941    2 Sheets-Sheet 1
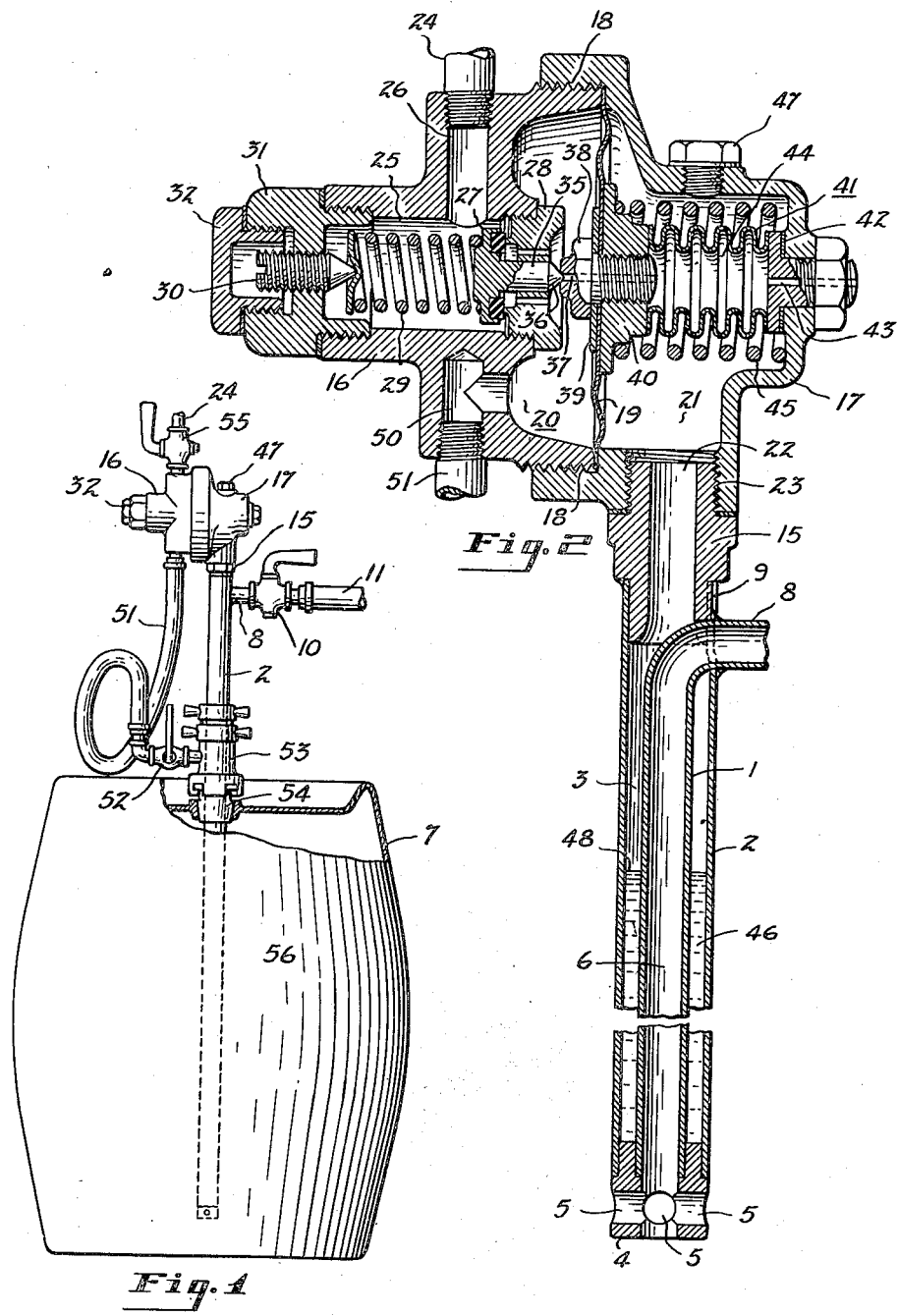
INVENTOR
Wallace R. Kromer
Harvey F. Elliott
BY Evans + McCoy
ATTORNEYS

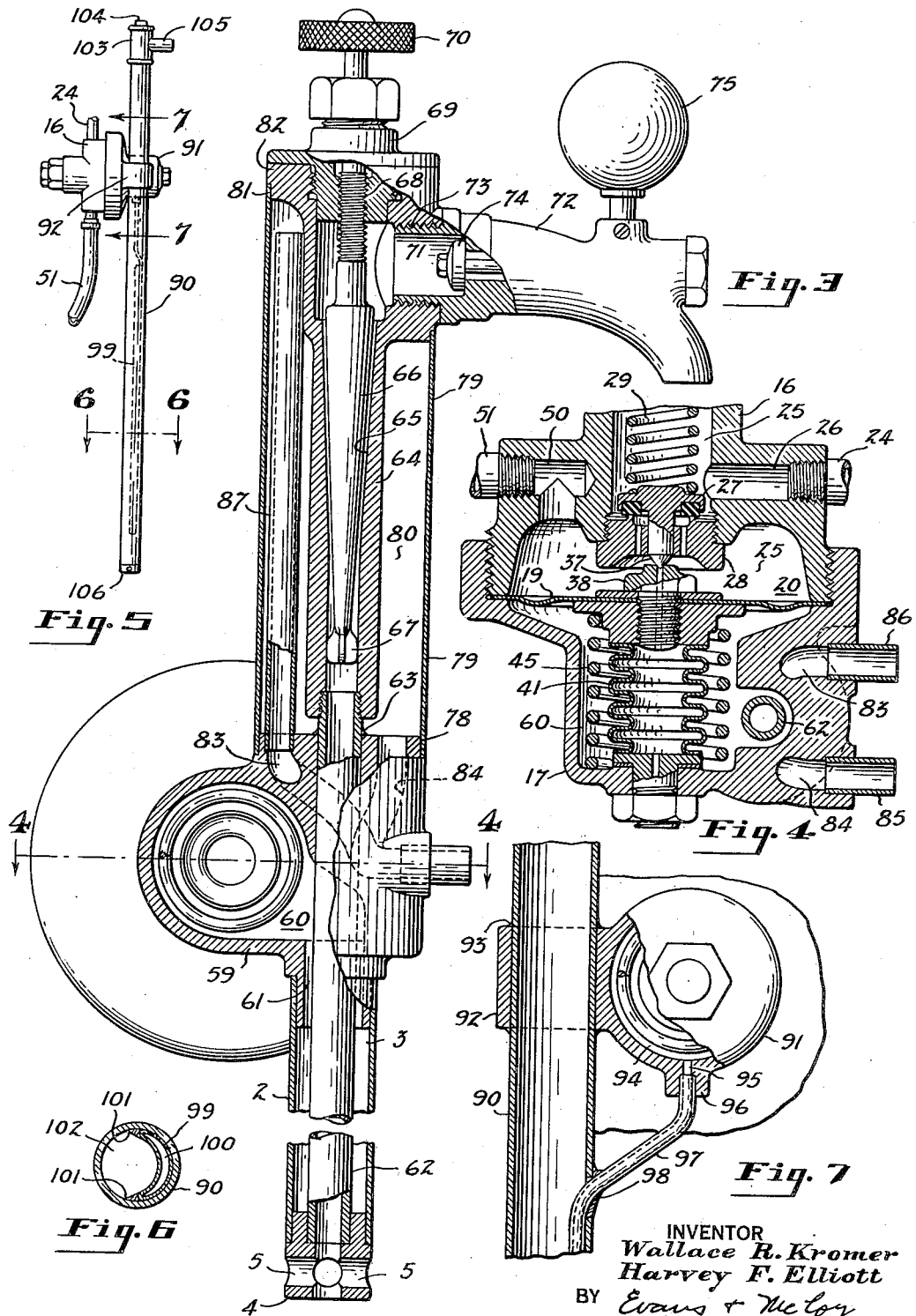

Patented Nov. 30, 1943

2,335,595

UNITED STATES PATENT OFFICE 2,335,595

BEVERAGE DISPENSER

Wallace R. Kromer and Harvey F. Elliott, Cleveland, Ohio, assignors to The Kromer-Nierman Co., Cleveland, Ohio, a corporation of Ohio Application February 20, 1941, Serial No. 379,824

18 Claims. (Cl. 225—1)

This invention relates to an improved method of and apparatus or equipment for storing and dispensing beverages, and more particularly to an improved method and apparatus for controlling the supply of gas to a dispenser or storage receptacle for beer and the like. This application is a continuation in part of our co-pending application, Serial No. 365,480, filed November 13, 1940. As set forth in our copending application, it is desirable to maintain a predetermined quantity of carbon dioxide gas dissolved in stored carbonated beverages, particularly beer and ale. The different temperatures to which stored beer and ale are subjected over a prolonged dispensing period make it difficult to retain a pressure on the beverage that will retain the desired quantity of carbon dioxide gas dissolved in the beverage.

When beverage such as beer or ale of the character contemplated in connection with this invention increases in temperature while being maintained under a constant or uniform pressure, its capacity to retain brewed-in gases, such as carbon dioxide, is decreased. Therefore, it is then necessary to maintain or exert an increased pressure on the beverage to retain these gases dissolved within the beverage. When the temperature of such beverage is reduced, while the pressure of the carbon dioxide gas over the beverage is maintained constant, the solubility of the gas with which the beverage is charged increases. There is then a tendency for the beverage to become overcharged or over carbonated by absorbing the carbon dioxide gas maintained over the beverage unless the pressure of such gas is reduced in proportion to the reduction in temperature of the beverage. The pressure required to retain a given quantity of carbon dioxide gas charged in a body of beverage varies approximately in proportion to the temperature of the beverage. It follows that, to retain the brewed-in gas within the beverage, it is desirable to automatically increase and decrease the pressure of the gas maintained over the body of beverage in proportion to the temperature variations of the beverage.

It is the principal object of the present invention to provide improvements in the type of apparatus and the method of maintaining gas pressure on beverage disclosed in our earlier filed application. More specifically, the present invention has for one of its aims to provide a method of and apparatus for controlling pressure of gas on stored beverage wherein the admission of gas to the system is controlled in response to the temperature of a body of thermal responsive fluid maintained in the tap rod of the dispenser and in direct heat exchanging relation with the beverage inside the storage receptacle.

Another object is to provide a tap rod assembly for a beverage dispenser wherein a pressure regulating valve is supported solely by the tap rod.

A further object of the invention is to provide as a unitary structure for use in beverage dispensing systems a tap rod which includes an automatic pressure regulating valve and means for adjusting the drop in pressure on the beverage while the latter is being dispensed.

Numerous advantageous features of construction and arrangement of parts are obtained by the present invention, including means for cooling the beverage being dispensed while the beverage is being reduced in pressure; means for mounting a pressure regulating valve and pressure throttling device on a single tap rod to constitute a unitary structure; means for attaching an automatic pressure regulating valve to a tap rod in association with means for circulating a coolant through a jacket surrounding the upper portion of the tap rod structure; means for mounting an automatic pressure regulating valve on a tap rod and subjecting the diaphragm of the regulating valve to the pressure of a thermal responsive fluid contained within the tap rod; and a double walled tap rod structure providing a beverage passage and a chamber for thermal responsive fluid separated from the beverage passage and disposed in direct heat exchanging relation with respect to the beverage in the passage.

A still further object of the invention is to provide apparatus for automatically controlling the pressure on stored beverage, which apparatus is simple in design and construction and relatively inexpensive to manufacture. Other objects and advantages which relate generally to the objects and advantages set forth in our earlier filed application identified above will become apparent from the following detailed description of suitable embodiments of the invention.

In the drawings:

Figure 1 is an elevational view, partly in section and with parts removed, showing a tap rod structure embodying the present invention disposed in a beverage keg or transportation container and having conduits leading to other parts (not shown) of a conventional type of beverage dispensing system;

Fig. 2 is a vertical sectional view, with parts broken away and with parts removed, showing the tap rod structure of Fig. 1 and enlarged with respect to that figure;

Fig. 3 is an elevational view, partly in section and with parts broken away, showing a modification of the invention wherein a cooling and beverage throttling device, as well as a dispensing faucet, are mounted on a tap rod in association with an automatic gas pressure regulating valve to provide a unitary structure for use in beverage dispensing systems;

Fig. 4 is a horizontal sectional view, with parts removed, taken substantially on the line 4—4 of Fig. 3;

Fig. 5 is an elevational view, with parts removed, showing another modification of the invention wherein the automatic pressure regulating valve is mounted directly on the tap rod and is controlled by thermal responsive fluid contained in a bulb or receptacle disposed within the tap rod;

Fig. 6 is a sectional detail taken substantially on the line 6—6 of Fig. 5 and enlarged with respect thereto; and Fig. 7 is a detail view, partly in section and with parts broken away, taken substantially on the line 7—7 of Fig. 5 and enlarged with respect thereto.

Referring to the drawings by numerals of reference which indicate like parts throughout the several views, the principal aspects of the invention relate to an arrangement wherein the chamber for thermal responsive fluid is formed or supported within the tap rod so as to be placed in direct heat exchanging relation to beverage in the transportation or storage receptacle. In the embodiment shown in Figs. 1 and 2, the tap rod comprises inner and outer tubes 1 and 2 spaced from one another to provide a cylindrical chamber 3 that surrounds the inner tube 1. At the bottom of the tap rod this chamber is closed by a fitting or sleeve 4 which embraces the end of the inner tube and is embraced by the end of the outer tube. Passages 5 in the fitting 4 communicate with passage 6 within the tube 1 so that beer or other beverage may be drawn therethrough from adjacent the bottom of the keg or receptacle 7 in which the beverage is stored.

The upper end of the inner tube 1 is formed with a laterally extending portion 8 that extends through an elongated opening or slot 9 in the wall of the outer tube 2. The lateral portion 8 receives a valve 10 having connection with a beverage line or conduit 11 which conducts the beverage withdrawn from the keg to other parts of the dispensing system, such, for example, as a cooler and a dispensing faucet. The opening 9 extends through the upper end of the outer tube 2 and the extension 8 of the inner tube is soldered or brazed to the outer tube and to a sleeve or ferrule 15 secured in the upper end of the outer tube 2. This sleeve supports a housing or casing comprising members 16 and 17 threaded together at 18. A flexible diaphragm 19 is retained between the casing members 16 and 17 and divides the interior of the casing or housing into a low pressure chamber 20 and a control chamber 21, the latter communicating with the interior of the tap rod and the chamber 3 through a passage 22 in the ferrule or sleeve 15, the casing member 17 being threaded onto the ferrule as indicated at 23. High pressure air or gas such as carbon dioxide from a suitable source of supply (not shown) is carried to the casing or housing through a conductor 24 connected to the housing member 16 and communicating with high pressure chamber 25 through a radial passage 26. The high pressure chamber 25 is sealed by a movable valve 27 engageable with a valve seat formed on a member 28 separating the chamber 20 from the chamber 25. The valve 27 is pressed toward the valve seat by a helical compression spring 29 extending through the high pressure chamber 25 and adjustable by a screw 30 threaded in a cap 31 screwed into one end of the housing member 16. A closure 32 may be provided to seal the threaded opening in the cap 31.

A stem 35 on the valve 27 extends through the member 28 and is formed with a tapered end 36 that is engageable with a valve seat formed at one end of an axial passage 37 formed in a screw 38 that extends through the diaphragm 19. A sealing washer 39 and a nut 40 are received on the screw 38 on opposite sides of the diaphragm 19 to form a seal with the latter. The nut 40 is connected by an expansible and contractible bellows 41, of the type commonly referred to as a Sylphon, to a flanged screw 42 extending through the end of the housing member 17 and provided with an axial passage 43 which opens to the atmosphere. Thus, through the passages 37 and 43 and chamber 44 in the Sylphon or bellows, the low pressure gas chamber 20 may be placed in communication with the atmosphere so that relatively high pressure gas in the chamber 20 may be allowed to escape. Helical compression spring 45 disposed about the bellows or Sylphon 41 normally bears against the nut 40 to urge the flexible diaphragm 19 to the left so that the tapered end 36 on the valve pin 35 normally seals the passage 37 to prevent the loss of gas to the atmosphere.

Within the chamber 3 and the tap rod structure is placed a suitable quantity of thermal responsive fluid, indicated at 46. This fluid may be introduced through an opening in the casing member 17 normally closed by a screw 47. The specific thermal responsive fluid to be employed is not critical, several commercial fluids used in thermal devices, such as sulphur dioxide and ethyl chloride being satisfactory. It is desirable that the fluid used maintain a gas or vapor pressure in the portion of the chamber 3 above the fluid level, indicated at 48, that varies with the temperature of the fluid 46. Variations in the pressure of the vapor or gas in the upper portion of the chamber 3 are transmitted through the passage 22 into the control chamber 21 so that one side of the diaphragm 19 is subjected to the vapor or gas pressure established by the thermal responsive fluid maintained immersed in and in direct heat exchanging relation to beverage in the storage or transportation receptacle 7. In order that the variations in pressure within the control chamber 21 may more closely approximate the variations in pressure within the keg 7 resulting from a change in temperature of the beverage, it is desirable that the thermal responsive fluid 46 have pressure temperature characteristics similar or closely analogous to the pressure temperature characteristics of beer or ale or other beverage being stored and dispensed. For example, a solution of carbon dioxide in water may be employed as the thermal responsive fluid. An increase in the temperature of the beverage transmitted directly to the thermal responsive fluid 36 would then decrease the solubility of the carbon dioxide gas, thereby increasing the pressure in the upper end of the tube 2 and the control chamber 21. Conversely, a decrease in the temperature of the beverage transmitted directly to the thermal responsive fluid 46 would increase the solubility of carbon dioxide gas therein, thereby decreasing the carbon dioxide gas pressure in the upper end of the tube 2 and control chamber 21.

Before introducing the thermal responsive fluid 46 into the chamber 3, it is preferable to evacuate or partly evacuate the control chamber 21 and the fluid chamber 3 so that the responsiveness and the characteristics of the thermal responsive fluid are not impaired by air pressure acting on the diaphragm 19.

Gas or carbon dioxide from the source of supply, admitted to the low pressure chamber 20 through the valve member 28, flows through a passage 50 in the casing member 16 and thence through a conduit 51 provided with a valve 52 to a sleeve-like fixture 53 connected to bung 54 of the keg or receptacle 7. The fitting 53 is of conventional construction and receives the tap rod to support the latter with its lower end immersed in the beverage and provides an air or gas-tight seal between the tap rod and the keg or receptacle.

With the apparatus assembled as shown in Fig. 1, the valve 55 in the high pressure gas conductor 24 is opened to admit gas or carbon dioxide from the supply source into the high pressure chamber 25 of the automatic pressure regulating valve. Valve 52 is opened so that gas from the low pressure chamber 20 may be introduced into the keg 7 through the fitting 53, the latter being suitably chambered to provide this connection, as is well known. The valve 10 may be opened to permit beverage to flow to the other parts of the dispensing system, although the actual drawing of beverage from the storage or supply receptacle 7 is not an essential feature of the present invention since the benefits and advantages of our improvements may be obtained whether the beer is being withdrawn from the storage receptacle from time to time or allowed to remain in storage.

The springs 29 and 45 are adjusted or selected so that the latter, acting through the screw 38 and the valve stem 35, holds the valve 27 off the seat of the valve member 28, allowing gas to flow into low pressure chamber 20 and thence into the keg or receptacle 7. Gas pressure in the chamber 20 acts on the diaphragm 19 to overcome or resist the pressure of the spring 45, allowing the spring 29 to force the valve 27 into sealing engagement with the valve seat on the member 28. The pressure at which this sealing occurs depends upon the adjustment of the spring 29, as is well known. A drop in pressure within the keg or within the chamber 20 allows the spring 45 to unseat the valve 27 and to admit additional gas to the chamber 20 and the keg until the pressure is again restored to that which overcomes or balances the spring 45 and allows the spring 29 to again seat the valve 27. Should the gas pressure in the keg 7 and chamber 20 increase sufficiently to overcome the spring 45 and the pressure in the control chamber 21, the valve seat screw 38 is moved away from the tapered end 36 of the valve stem, allowing gas to escape from the keg or chamber 20 through the passages 37 and 43 and the chamber 44 in the Sylphon or bellows 41. This escape of gas from the keg continues until the pressure in the chamber 20 balances the force of the spring 45 augmented by the pressure in the chamber 21, and the valve screw 38 seats against the tapered end 36 of the valve stem, sealing the passage 37.

As previously mentioned, the pressure in the upper end of the fluid chamber 3 and the control chamber 21 is raised and lowered as the temperature of the beverage increases or decreases since the thermal responsive fluid 46 is immersed in the beverage within the keg and is in direct heat exchanging relation therewith through the tubes 1 and 2. These tubes are preferably made of material having high heat conductivity, such, for example, as plated brass or stainless steel. While the inner tube 1 may be made of a relatively soft material, it is preferable that the outer tube 2 be relatively hard and strong since it constitutes the sole support for the automatic pressure regulating valve and the unitary tap rod structure disclosed is frequently handled in tapping and re-tapping a succession of kegs or storage receptacles.

In operation an increase in temperature of beer or other beverage in the storage receptacle 7 results in an increase in temperature of the thermal responsive fluid 36, which thereby increases the pressure of the gas or vapor in the upper part of the chamber 3 and within the control chamber 21. This increased pressure within the chamber 21 tends to force the diaphragm 19 to the left, thereby pressing against the valve stem 35 to unseat the valve 27 and admit additional gas through the member 28 into the low pressure chamber 20 and the keg. Thus, the pressure regulating valve is automatically adjusted to maintain a higher gas pressure in the keg or receptacle in response to the temperature increase of the beverage. Since the increased pressure within the control chamber 21 augments the force exerted on the diaphragm by the spring 45, a greater pressure is required in the chamber 20 to move the valve seat on the screw 38 away from the tapered end 36 of the valve stem 35. Accordingly, in addition to admitting gas under a higher pressure to the keg or receptacle 7, the increased gas or vapor pressure in the control chamber increases the pressure at which gas or air is permitted to escape to the atmosphere from the chamber 20 and the keg or receptacle through the passages 37 and 43 and the Sylphon chamber 44.

The surface 48 of the thermal responsive fluid 46 will, of course, rise and fall depending upon the temperature to which the fluid is subjected and upon the particular type of fluid used. For normal operation, however, it is satisfactory if the surface of the liquid in the chamber 3 be about half the height of the beverage within the keg or storage receptacle when the latter is filled and the thermal responsive fluid or liquid is at about 40° F. The specific height of the surface of the liquid is not critical and may be varied, the indicated height being preferable for optimum performance under normal dispensing conditions.

In the embodiment of the invention illustrated in Figs. 3 and 4, the apparatus of the present invention has been combined with the so-called direct draw type of dispensing equipment shown in United States Patent 2,162,842. The outer tube 2 is secured in a casing member 59 which replaces the casing member 17 of the pressure regulating valve illustrated in Figs. 1 and 2. The casing member 16 and associated parts is the same in Figs. 3 and 4 as in Figs. 1 and 2. Furthermore, the diaphragm 19 with its associated parts, including the Sylphon 41 and spring 45, are the same in Figs. 3 and 4 as in Figs. 1 and 2.

The housing or casing member 59 provides a control chamber 60 corresponding to the control chamber 21 previously described. The chamber 60 communicates with the upper end of the chamber 3 through a passage 61. A beverage conducting tube 62, corresponding to the inner tube 1 previously described, is disposed within the outer tube 2 and extends upwardly through the casing or housing member 59. There is a clearance around the tube 62 in the passage 61 to provide for flow of gas between the upper end of the chamber 3 and the control chamber 60. In the upper portion of the casing or housing 59 the tube 62 has a tight fit, preferably being soldered or brazed as indicated at 63, to prevent the loss of thermal responsive fluid from the chamber 60.

A tubular member 64 formed with a tapered passage 65 is threaded on the upper end of the inner tube 62 and receives a tapered valve body 66 guided by a spider 67 and provided with an adjusting screw 68 that extends through a cap or bushing 69 at the extreme top of the tap rod structure by means of a knurled thumb wheel 70 secured on the extension of the threaded rod 68. The valve body 66 may be axially or longitudinally adjusted in the passage 66 to vary the resistance to the flow of beverage, thereby reducing the pressure of beverage received in chamber 71 formed in the upper end of the tubular member 64 as a continuation of the passage 65.

A dispensing faucet 72 threaded at 73 into the side of the tubular member 64 adjacent the top of the latter includes a valve 74 and an actuating knob 75 by means of which the valve 74 may be operated to release beverage from the chamber 71 for dispensing as desired.

The housing or casing member 59 may be conveniently made as a casting which is provided with a reduced diameter end portion 78 that receives a tubular jacket 79 disposed about the beverage throttling tube 64 and spaced from the latter to provide a cooling chamber 80. The upper end of the tubular jacket 79 may fit on a reduced section portion 81 of enlarged upper end 82 of the tubular member 64. If desired, the tubular jacket 79 may be soldered or brazed to the reduced portions 78 and 81. Passages 83 and 84 are formed in the casting or casing member to serve as inlets and outlets for cooling liquid or refrigerant to be circulated through the chamber 80. Such coolant may be supplied through conductors 85 and 86 from a suitable source not shown. Preferably, the coolant may be ice water maintained at a proper temperature by a refrigerant or melting ice and circulated by a pump, as is well known. If desired, an extension tube 87 may be connected to the inlet passage 83 to carry the cooling liquid to the upper end of the cooling chamber 80 for reverse flow of the coolant with respect to the beverage and to withdraw the coolant from one end of the cooling chamber while introducing it at the other.

The operation of the embodiment of the invention shown in Figs. 3 and 4 is similar to the operation of the device shown in Figs. 1 and 2 and described above. The conduit 24 supplies air or carbon dioxide gas to the high pressure chamber 25 of the valve through the inlet passage 26, and the control pressure maintained by the automatic valve in the chamber 20 is transmitted to the keg or storage receptacle in which the tap rod is supported through the outlet passage 50, which is connected to the keg by the conduit 51.

One advantage of the device shown in Figs. 3 and 4 is that a substantially complete dispensing apparatus, apart from the gas supply and the coolant supply, is provided in a single unitary structure. The space between the outer tube 1 and the beverage conduit or tube 62 insulates the latter between the keg and the casing member 59 to minimize the absorption of heat by the beer in this portion of the beverage conduit. Circulation of coolant through the passages 83 and 84 in the casing 59 cools the latter because of the conductivity of the metal of which the casing is formed, while the metal parts forming the tubular member 64 and faucet 72 are cooled by the coolant in the chamber 80, so that beverage being dispensed is chilled to the proper or desired temperature. The combination of the beverage throttling device comprising the tapered passage 65 and tapered valve body 66 with the automatic gas regulating valve provides a dispenser which delivers beverage of uniform taste and quality since the bartender or operator can readily adjust the resistance to the flow of beverage being dispensed as the need for such arises because of fluctuations in the gas pressure on the beverage and the storage receptacle or container under the control of the automatic gas pressure regulating valve.

Although the chamber for the thermal responsive fluid has been provided, in the modifications illustrated in Figs. 1 through 4, by means of concentric or nested tubes or conduits, other equivalent arrangements are contemplated and may be used. For example, a bulb or similar structure may be employed and a modification of this character is illustrated in Figs. 5 through 7. In this modification the tubular tap rod is indicated at 90. The operating parts of the automatic pressure regulating valve are substantially the same as those shown in Figs. 1 and 2 and described in connection therewith, with the exception that the casing member 17 shown in Figs. 1 and 2 is replaced by a casing member 91 having a lateral extension 92 that is attached to the tap rod 90. The extension 92 supports the valve on the tap rod and may be conveniently made in the form of a sleeve that embraces the tap rod, being secured in place by soldering or brazing, indicated at 93. Control chamber 94 within the casing member 91, and corresponding to the control chambers 21 and 60 previously described, communicates through a passage 95 in a boss 96 formed on the casing member 91 with a bendable tubular metal conduit 97 which is sweated or brazed into the boss 96 and extends laterally through a hole in the tap rod 90. The opening in the tap rod to receive the conduit 97 may be conveniently sealed or closed by soldering or brazing, indicated at 98.

Within the tap rod 90 the conduit 97 is connected to an elongated crescent shaped bulb 99 having a chamber 100 for the thermal responsive fluid. As shown in Fig. 6, the bulb 99 is formed to fit snugly against the inside of the tap rod 90 and may be soldered in place preferably throughout its entire length, as indicated at 101, this solder forming fillets or coves which provide a smooth continuous surface within the tap rod, improving the flow of beverage and facilitating cleaning of the beverage passage, indicated at 102.

The tap rod 90 at its upper end may be provided with a T-fitting 103 having a plug 104 that may be removed for cleaning. The beverage is withdrawn through a lateral extension 105 on the fitting 103. The usual cap 106 is threaded into the bottom of the tap rod 90 and corresponds to the cap 4 previously described.

The operation of the modified form of tap rod and pressure regulating valve unit shown in Figs. 5 through 7 is similar to that of the device illustrated in Figs. 1 and 2. The thermal responsive fluid contained in the bulb chamber 100 is maintained immersed and in direct heat exchanging relation with the beverage in the keg or storage receptacle. For this purpose it is preferable that the bulb 99 and the tap rod 90 be made of metal having high heat conductivity so that temperature changes of the beverage are quickly transmitted to the thermal responsive fluid within the chamber 100. Pressure variations of the thermal responsive fluid in the bulb chamber 100 are transmitted through the conduit 97 to the control chamber 94 to influence or act upon the flexible diaphragm corresponding to the diaphragm 19 previously described.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What we claim is:

1. Beverage dispensing apparatus comprising a gas tight storage receptacle for a mass of the beverage, a pressure regulating valve and means connecting the same to the receptacle for supplying gas under variable pressure to the latter, means providing a fluid chamber immersed in the mass of beverage in the receptacle and in direct heat exchanging relation with beverage in the receptacle, a thermal responsive fluid in the chamber, and conduit means connecting the chamber and the valve, said valve being responsive to variations in the pressure of said fluid to increase the pressure of the supplied gas upon an increase in pressure of the fluid and to decrease the pressure of the supplied gas upon a decrease in pressure of the fluid.

2. Beverage dispensing apparatus comprising a gas tight storage receptacle for a mass of the beverage, a tap rod extending into the receptacle for withdrawing beverage as desired, a pressure regulating valve and means connecting the same to the receptacle for supplying gas under variable pressure to the latter, means associated with the tap rod to provide internally of the latter a fluid chamber immersed in the mass of beverage in the receptacle and in direct heat exchanging relation with beverage in the receptacle, a thermal responsive fluid in the chamber, and conduit means connecting the chamber and the valve, said valve being responsive to variations in the pressure of said fluid to increase the pressure of the supplied gas upon an increase in pressure of the fluid and to decrease the pressure of the supplied gas upon a decrease in pressure of the fluid.

3. Beverage dispensing apparatus comprising a gas tight storage receptacle for the beverage, a tap rod extending into the receptacle for withdrawing beverage as desired, a pressure regulating valve and means connecting the same to the receptacle for supplying gas under variable pressure to the latter, said tap rod including nested tubes spaced from one another to provide therebetween a fluid chamber in direct heat exchanging relation with beverage in the receptacle, a thermal responsive fluid in the chamber, and conduit means connecting the chamber and the valve, said valve being responsive to temperature induced variations in the pressure of said fluid to increase the pressure of the supplied gas upon an increase in pressure of the fluid and to decrease the pressure of the supplied gas upon a decrease in pressure of the fluid.

4. Beverage dispensing apparatus comprising a gas tight storage receptacle for a mass of the beverage, a pressure regulating valve and means connecting the same to the receptacle for supplying gas under variable pressure to the latter, means providing a fluid chamber immersed in the mass of beverage in the receptacle and in direct heat exchanging relation with beverage in the receptacle, a thermal responsive fluid in the chamber, and conduit means connecting the chamber and the valve, said valve being responsive to temperature induced variations in the pressure of said fluid to increase the pressure of the supplied gas upon an increase in pressure of the fluid and to decrease the pressure of the supplied gas upon a decrease in pressure of the fluid, said fluid having pressure temperature relationship approximating those of the beverage whereby the pressure of the supplied gas is varied substantially in proportion to variations in the pressure normally prevailing on the beverage within the receptacle.

5. Beverage dispensing apparatus comprising a receptacle for storing the beverage under pressure, a rod extending into the receptacle and immersed in the beverage, said rod including an inner tube through which beverage can be withdrawn as desired and an outer tube cooperating with the inner tube to provide a chamber in direct heat exchanging relation with beverage in the receptacle, a pressure regulating valve having a diaphragm and means connecting the valve to the receptacle for supplying gas to the latter under variable pressure, a thermal responsive fluid in the chamber, and means subjecting the diaphragm to the pressure of said fluid to vary the pressure of the supplied gas in response to temperature changes of the beverage.

6. Beverage dispensing apparatus comprising a receptacle for storing the beverage under pressure, a rod extending into the receptacle and immersed in the beverage, said rod including an inner tube through which beverage can be withdrawn as desired and an outer tube cooperating with the inner tube to provide a chamber in direct heat exchanging relation with beverage in the receptacle, a pressure regulating valve mounted on the rod externally of the receptacle and having a diaphragm and conduit means connecting the valve to the receptacle for supplying gas to the latter under variable pressure, a thermal responsive fluid in the chamber, and means subjecting the diaphragm to the pressure of said fluid to vary the pressure of the supplied gas in response to temperature changes of the beverage, thereby compensating for increases in gas pressure within the beverage resulting from temperature increases of the beverage.

7. Beverage dispensing apparatus comprising a receptacle for storing the beverage under pressure, a rod extending into the receptacle and immersed in the beverage, said rod including an inner tube through which beverage can be withdrawn as desired and an outer tube cooperating with the inner tube to provide a chamber in direct heat exchanging relation with beverage in the receptacle, a pressure regulating valve mounted on the outer tube externally of the receptacle and supported solely by the rod, said valve having a diaphragm actuable by fluid pressure and conduit means connecting the valve to the receptacle for supplying gas to the latter under variable pressure, a thermal responsive fluid in the chamber, and means subjecting the diaphragm to the pressure of said fluid to vary the pressure of the supplied gas in response to temperature changes of the beverage.

8. Beverage dispensing apparatus comprising an outer elongated tube and a smaller tube nested within the outer tube and spaced therefrom to provide a fluid chamber, means connecting the tubes together at one end of the chamber to close the latter, an automatic pressure regulating valve connectable to a source of gas under pressure and to a beverage storage receptacle for supplying gas under pressure to the latter, said valve including a casing mounted on the outer tube and containing a diaphragm dividing the interior thereof into a gas chamber and a control chamber, mechanism within the casing for controlling gas flow through the gas chamber in response to movement of the diaphragm, and means providing a passage between the fluid chamber and the control chamber to subject the diaphragm to the fluid pressure prevailing in the fluid chamber.

9. Beverage dispensing apparatus comprising a tap rod for insertion into a storage receptacle, an automatic pressure regulating valve mounted on the tap rod and having a diaphragm, means connected to the valve for conducting high pressure gas thereto and for delivering controlled pressure gas to the receptacle from the valve, thermal responsive means carried by the rod and arranged to influence the diaphragm to increase the pressure of delivered gas upon an increase in temperature of beverage in the receptacle and to decrease the pressure of delivered gas upon a decrease in temperature of beverage in the receptacle, adjustable means connected to the tap rod to receive beverage directly therefrom and to throttle the same to desired dispensing pressure, and a faucet for receiving throttled beverage and through which the latter can be dispensed as desired without varying the adjustment of the throttling means.

10. Beverage dispensing apparatus comprising a tap rod for insertion into a storage receptacle, an automatic pressure regulating valve mounted on the tap rod and having a diaphragm, means connected to the valve for conducting high pressure gas thereto and for delivering controlled pressure gas to the receptacle from the valve, thermal responsive means carried by the rod and arranged to influence the diaphragm to increase the pressure of delivered gas upon an increase in temperature of beverage in the receptacle and to decrease the pressure of delivered gas upon a decrease in temperature of beverage in the receptacle, an adjustable area restrictor mounted on the rod to receive beverage directly therefrom and to throttle such beverage to desired dispensing pressure, and a faucet for receiving throttled beverage and through which the latter can be dispensed as desired without varying the adjustment of the throttling means.

11. Beverage dispensing apparatus comprising a tap rod for insertion into a storage receptacle, an automatic pressure regulating valve mounted on the tap rod and having a diaphragm, means connected to the valve for conducting high pressure gas thereto and for delivering controlled pressure gas to the receptacle from the valve, thermal responsive means carried by the rod and arranged to influence the diaphragm to increase the pressure of delivered gas upon an increase in temperature of beverage in the receptacle and to decrease the pressure of delivered gas upon a decrease in temperature of beverage in the receptacle, an adjustable area restrictor mounted on the rod to receive beverage directly therefrom and to throttle such beverage to desired dispensing pressure, and a faucet mounted on the tap rod and supported solely thereby for receiving throttled beverage and through which the latter can be dispensed as desired without varying the adjustment of the throttling means.

12. Beverage dispensing apparatus comprising a tap rod for insertion into a storage receptacle, an automatic pressure regulating valve mounted on the tap rod and having a diaphragm, means connected to the valve for conducting high pressure gas thereto and for delivering controlled pressure gas to the receptacle from the valve, thermal responsive means carried by the rod and arranged to influence the diaphragm to increase the pressure of delivered gas upon an increase in temperature of beverage in the receptacle and to decrease the pressure of delivered gas upon a decrease in temperature of beverage in the receptacle, an adjustable area restrictor mounted on the rod to receive beverage directly therefrom and to throttle such beverage to desired dispensing pressure, a faucet mounted on the tap rod and supported solely thereby for receiving throttled beverage and through which the latter can be dispensed as desired without varying the adjustment of the throttling means, a jacket surrounding the restrictor and part of the rod to provide a cooling liquid chamber, and inlet and outlet means for introducing and withdrawing cooling liquid to and from the chamber.

13. In a beverage dispenser, a draft tube for insertion into a keg or the like, an automatic gas pressure regulating valve mounted on the tube and having a diaphragm for controlling the flow of gas through the valve, a crescent shaped bulb attached to the inside of the tube and providing therewith a generally smooth contoured beverage passage through the tube, a thermal responsive fluid in the bulb, and a conduit connecting the bulb and the valve to subject the diaphragm to the pressure of the fluid.

14. A unitary tap rod structure for beverage dispensers comprising a pair of nested tubes disposed one within the other and providing a beverage passage and a chamber for thermal responsive fluid in direct heat exchanging relation to a portion of said passage, an automatic pressure regulating valve secured on one of the tubes and having therein a fluid chamber and fluid actuable means in said valve chamber for operating the valve, at least one of said tubes being rigid and of elongated character for insertion through the bunghole of a beverage receptacle to a position in which said portion of the beverage passage and the tube chamber are disposed within the receptacle for immersion in beverage contained in the latter and the valve is supported externally of the receptacle by the tube to which the valve is secured, an expansible thermal responsive fluid in the tube chamber, and means connecting the tube chamber to the valve chamber for subjecting said fluid actuable means to the pressure of the expansible fluid, whereby said regulating valve is automatically controlled by said thermal fluid in direct response to temperature changes of beverage in the receptacle.

15. Tapping and gas controlling means for beverage dispensers comprising a double walled metal tap rod of high heat conductivity providing a beverage passage and a chamber for thermal responsive fluid, said tap rod being of elongated character for insertion through the bunghole of a beverage receptacle to a position in which one portion of the passage is disposed within the receptacle for immersion in beverage contained therein and another portion thereof extends through the receptacle bunghole into a portion of the tap rod outside the receptacle, the fluid chamber being in direct heat exchanging relation through the metal walls of the tap rod to said one portion of the passage and to beverage in the receptacle in which the tap rod is immersed, an automatic pressure regulating valve connectable to a source of gas under pressure and to the receptacle for supplying gas to the latter, said valve having a fluid chamber and fluid actuable means in said valve chamber for operating the valve, an expansible thermal responsive fluid in the tap rod chamber, and means connecting the tap rod chamber to the valve chamber for subjecting said fluid actuable means to the pressure of the expansible fluid, whereby the valve is automatically controlled by said thermal fluid in direct response to temperature changes of beverage in the receptacle and in said one portion of the tap rod passage.

16. Beverage dispensing apparatus comprising a gas-tight storage receptacle for the beverage, a tap rod structure extending into the receptacle for withdrawing beverage as desired, a pressure regulating valve and means connecting the same to the receptacle for supplying gas under variable pressure to the latter, said tap rod including means providing a chamber for thermal responsive fluid in direct heat exchanging relation with beverage in the receptacle, a thermal responsive fluid in the chamber, and conduit means connecting the chamber and the valve, said valve being responsive to variations in the pressure of said fluid to increase the pressure of the supplied gas upon an increase in pressure of the fluid and to decrease the pressure of the supplied gas upon a decrease in pressure of the fluid.

17. Beverage dispensing apparatus comprising a gas-tight receptacle for containing a large mass of beverage, a tap rod structure extending into the receptacle and including means providing a passage for withdrawal of beverage from said mass thereof as desired and a chamber for thermal responsive fluid, a gas regulating valve having a casing and conduit means connecting the valve casing to the receptacle, other conduit means for connecting the valve to a suitable source of gas under pressure, said valve including adjustable means for releasing gas above a predetermined pressure from the valve casing and for admitting gas to the casing from said source when the gas in the valve casing falls below a predetermined pressure, a thermal responsive fluid in the chamber and conduit means connecting the chamber and the valve, said valve being responsive to variations in the pressure of said fluid to alter the adjustment of the gas releasing and gas admitting means.

18. Beverage dispensing apparatus comprising a gas-tight receptacle for containing a large mass of beverage charged with carbon dioxide, a gas regulating valve having a casing and conduit means connecting the casing to the receptacle, said valve including adjustable means for releasing gas above a predetermined pressure from the valve casing, thermal responsive means immersed in the mass of beverage in the receptacle and in direct heat exchanging relation thereto, and means effecting an operative connection between the valve and said thermal responsive means such that the adjustment of the gas releasing means is altered in response to temperature variations of the mass of beverage, whereby over-carbonization of the beverage is prevented by automatic release of excess gas from the receptacle.

WALLACE R. KROMER.
HARVEY F. ELLIOTT.